Nov. 13, 1956  B. J. SKOGLUND  2,770,038
AUTOMATIC FEED SYNCHRONIZING MECHANISM FOR
SUBSTANCES PREPARATORY TO PROCESSING
Filed May 12, 1952  6 Sheets-Sheet 1

Inventor.
Bertil J. Skoglund
by Larry C. Beverly
Attorney.

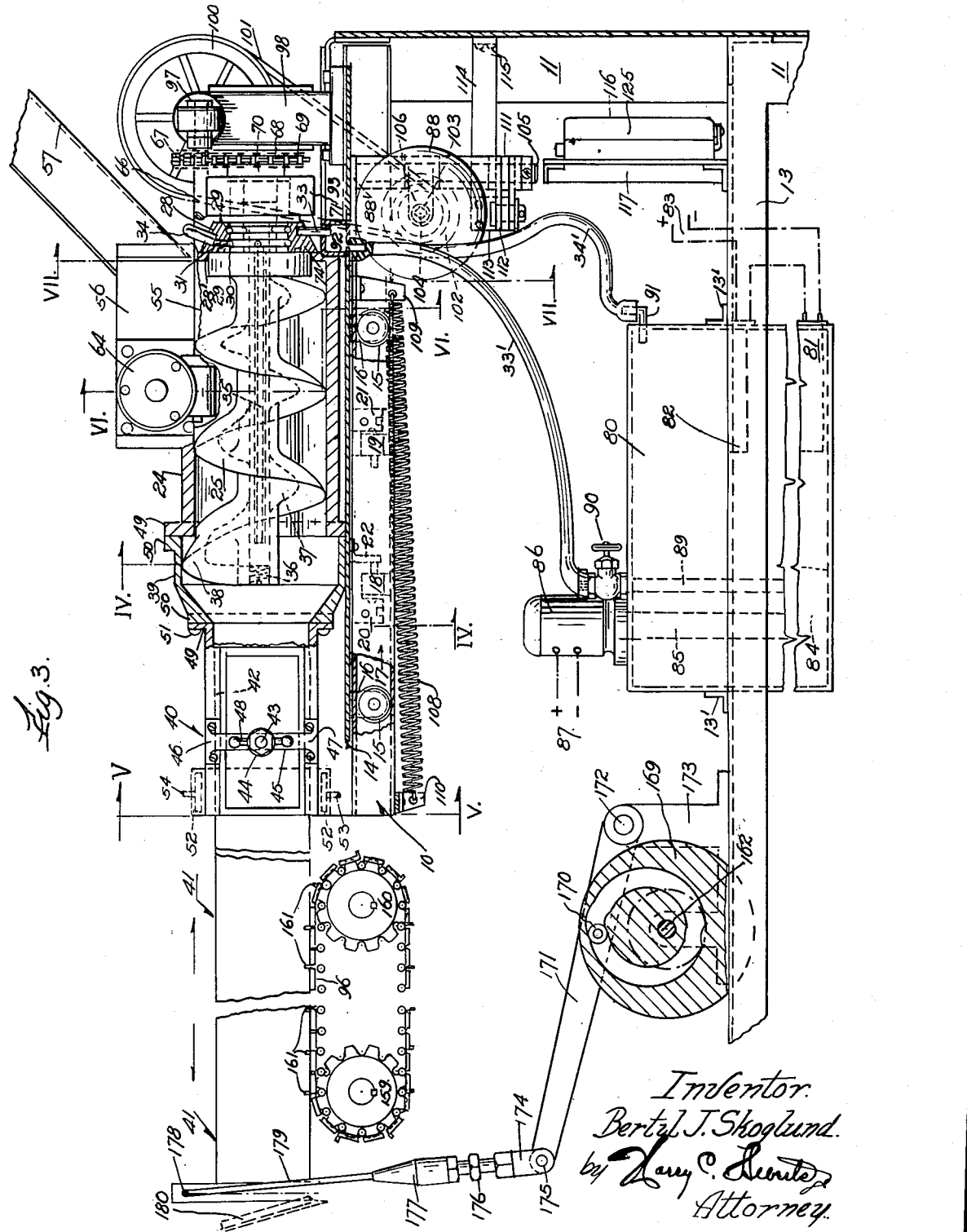

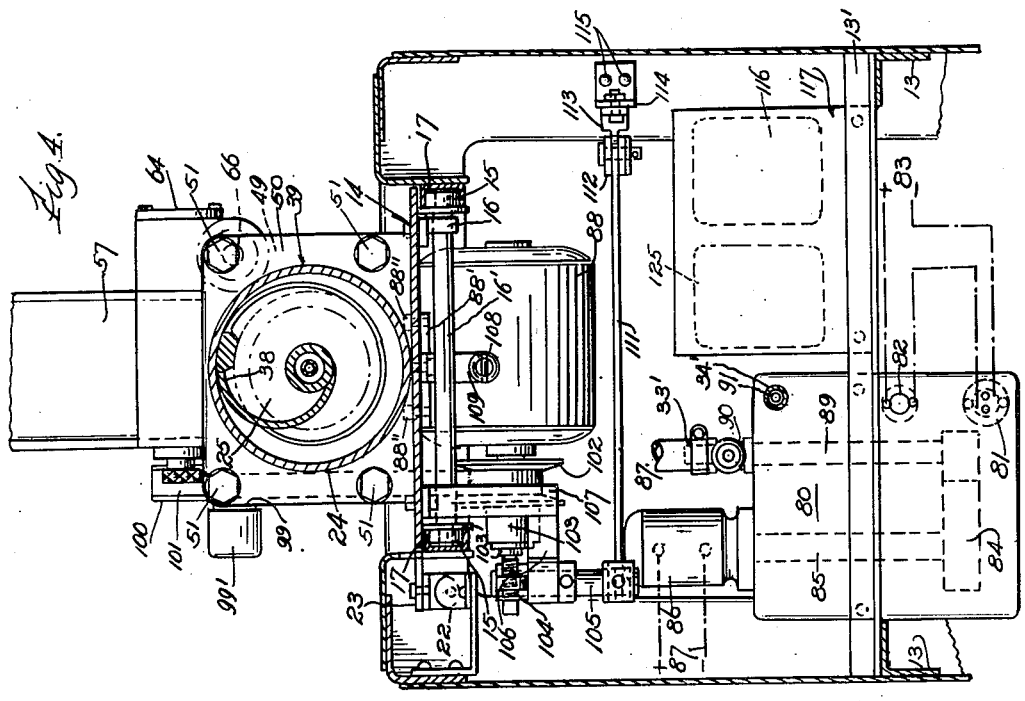

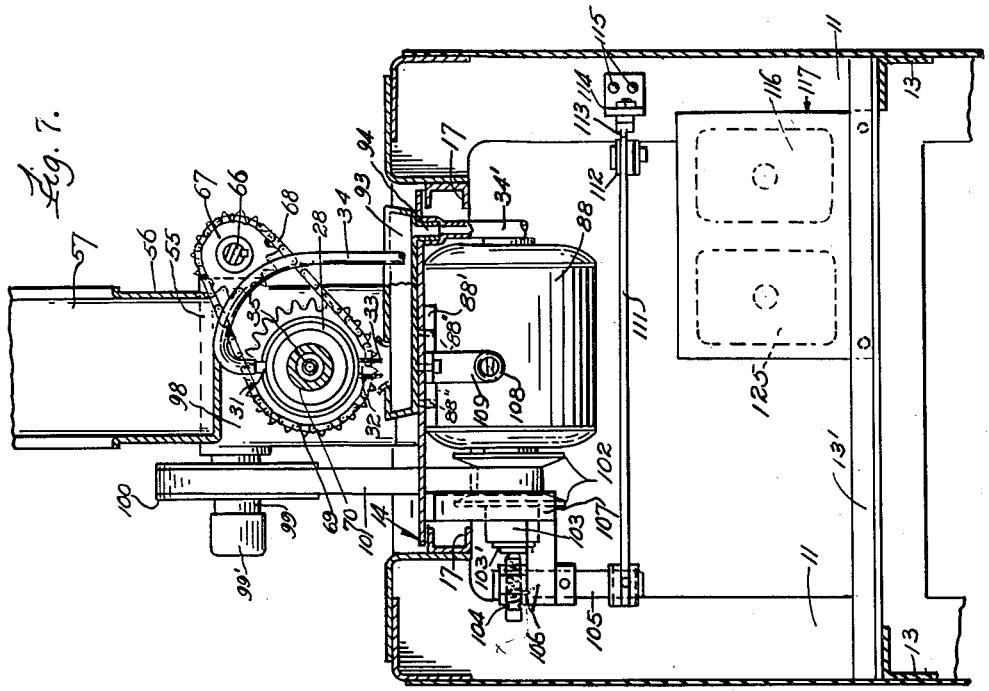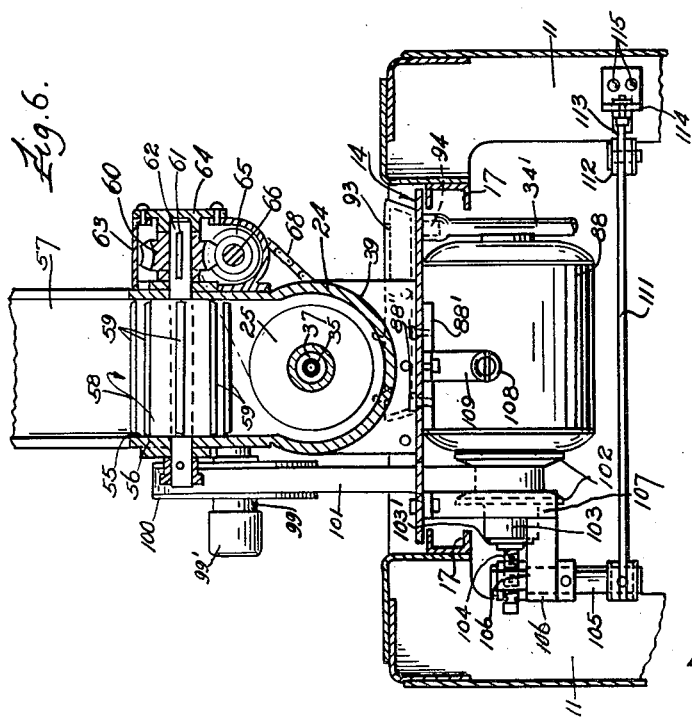

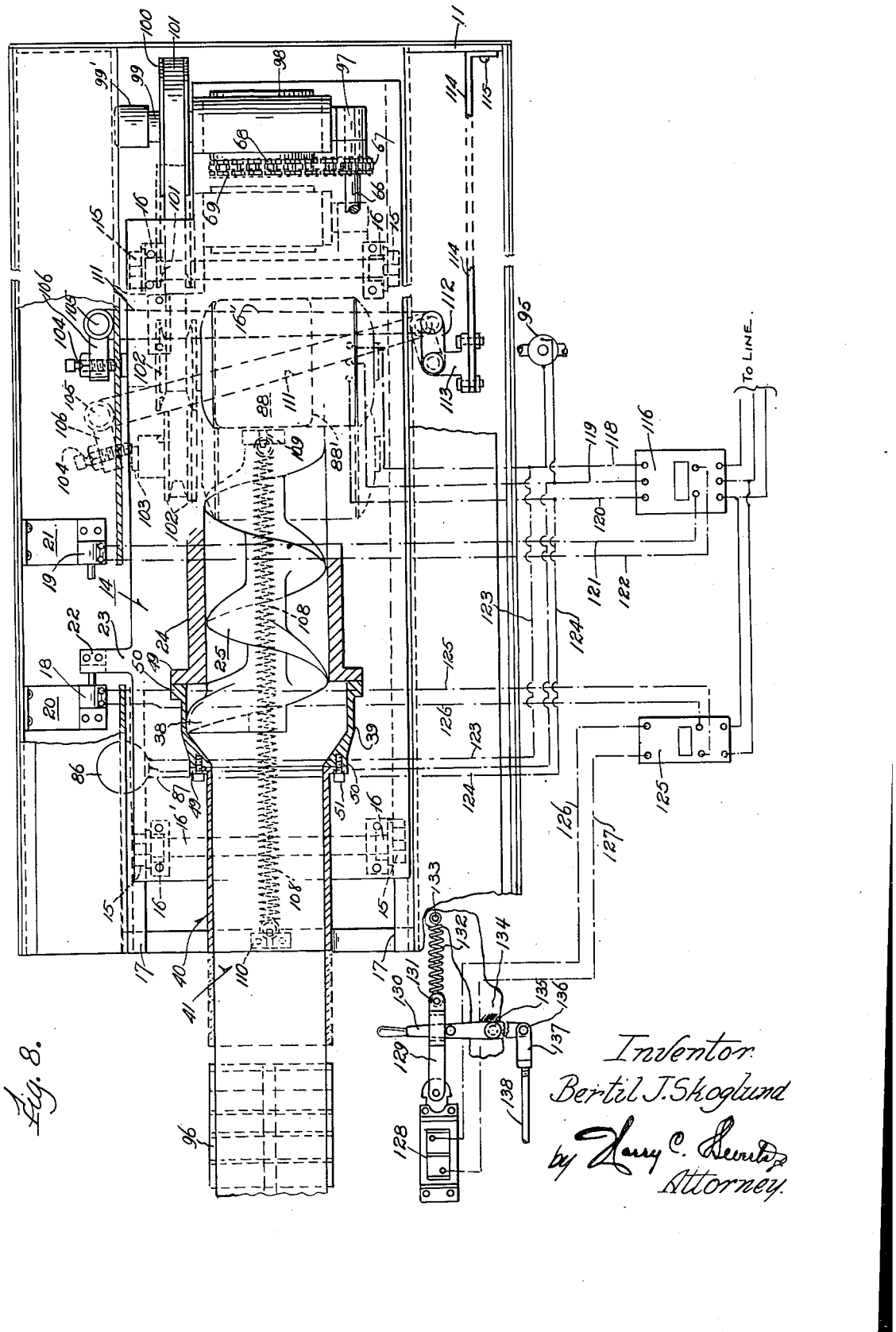

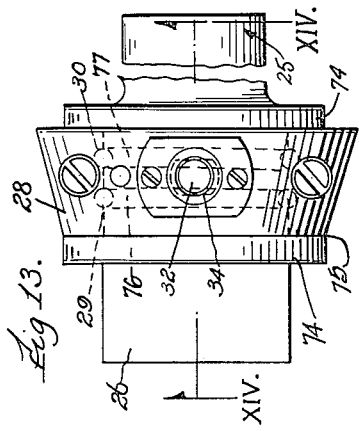
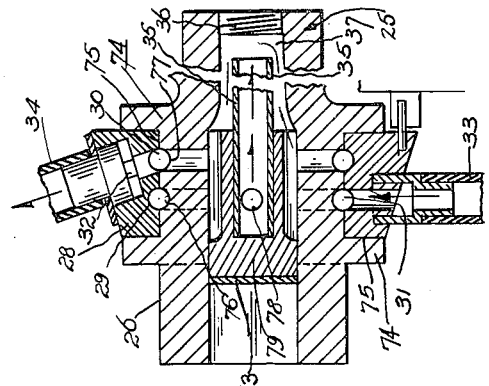
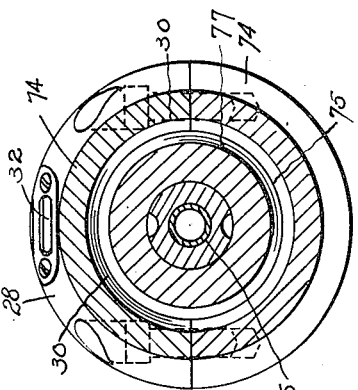
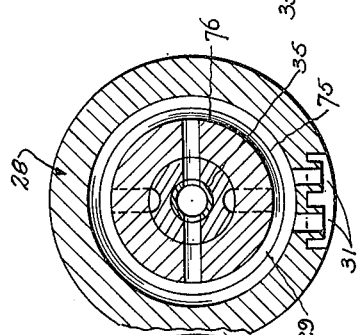
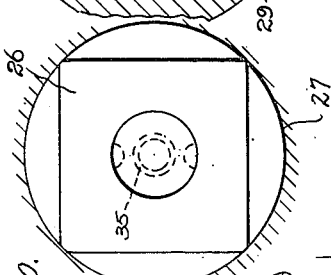

# United States Patent Office 2,770,038
Patented Nov. 13, 1956

2,770,038

AUTOMATIC FEED SYNCHRONIZING MECHANISM FOR SUBSTANCES PREPARATORY TO PROCESSING

Bertil J. Skoglund, Elmwood Park, Ill., assignor to Charles Doering and Henry Doering, Chicago, Ill.

Application May 12, 1952, Serial No. 288,971

20 Claims. (Cl. 31—8)

This invention relates to continuous automatic feeding devices and more particularly to continuously operating and self-synchronizing feeding instrumentalities for use in operative connection with and to increase the efficiency of processing machines such as but not limited to slicing and/or monogramming devices of the type illustrated and described in copending application Serial Number 26,906, now Patent 2,643,495 issued June 30, 1953, and 262,146 filed May 13, 1948 and December 17, 1951, although it may be employed with equal advantage with cutting and packaging machines and the like.

It contemplates more especially the provision of simultaneous feeding and automatically responsive synchronizing mechanism for co-ordinating the operation with slicing, impressing and cutting, wrapping and/or instrumentalities to continuously provide uniform segments, units, or slices for further processing as commercial practice may dictate.

The formation of plastic substances into uniform polygonal masses has been long and successfully practiced through extrusion and moulding, but the problem of segmenting or slicing or wrapping or otherwise processing these masses into preformed units, or slices or packages has been considerably more difficult based upon present production standards. This problem of feeding and automatically synchronizing the operation thereof with other processing instrumentalities without the intervention of an attendant is most difficult because the rate of preforming normally unsable substances such as butter, margarine, shortening products and the like varies with temperature, density, pasticity and other substance characteristics. and conditions.

The variation in rate of feeding and preforming these substances has necessitated manual intervention between the substance preforming and processing instrumentalities for normally plastic and unstable substances such as but not limited to butter and the like. The elimination of an attendant as well as improving the output of such devices with minimum entailment of labor has been solved with the teachings of the present invention by providing self-synchronizing continuous feeding and preforming instrumentalities so that the usual intermittent operation has been eliminated and smooth continuous synchronized improved preforming and feeding instrumentalities provided whereby successive uniform units may be produced from normally unstable plastic substances of varying characteristics so that minimum moving elements and negligible manual intervention are required and high production results from continuous rather than intermittent manual and machine operations.

Such uniformly preformed substances such as severed units or slabs may by way of illustration rather than limitation be advantageously utilized in the production of ornamented individual servings which has become increasingly popular in restaurants, hotels, vehicular dining units, and even in retail establishments catering to the home user. The teachings of the present invention concerns itself with improved feeding and preforming instrumentalities, which is self-synchronizing with processing instrumentalities, but is illustrated and described in connection with cutting and impressing or monogramming instrumentalities to show one form of its utility; however, this should be construed by way of illustration rather than by limitation in that the teachings of the invention could be used with equal advantage in conjunction with other processing equipment including wrapping devices.

It has been customary to form edible plastics such as butter and kindred edible substances into rectangular bricks of varying weights; however, these necessitated transverse and longitudinal severance with auxiliary devices to create rectangular segments primarily for restaurant purposes. Furthermore, manual intervention and intermittent operation was involved between the substance extruder and cutting or slicing units to maintain these elements in synchronized operation. This was necessary in that the extruding worms would not uniformly displace the substances which varied depending upon temperature, density, moisture contact, and other ingredients. This not only entailed much labor in the processing thereof for eventual serving to the customer, but also the contour thereof is only utilitarian and does not enhance the appearance thereof, and is an important factor in pleasing the taste of the individual customer.

The novel formation of edible plastics into adhering units of varied design imparts a continuous polygonal effect, serves to impart a more pleasant appearance thereto, and also eliminates considerable labor heretofore necessary in producing palatable segments thereof. Edible plastics produced in accordance with the teachings of the present invention require a single operating stroke severance and surface design formation, this being distinguished from the usual method of longitudinal and then transverse division of bricks into multiple segments of usual rectangular shape without any possible surface design that is not altogether advantageous for restaurant purposes.

Power operation of conveying means serves to feed slabs of substance in the path of the impressing and cutting instrumentalities to render the latter effective to convert the slabs into design impressed multiple segments or units of operations without manual intervention. This may be in the form of suitable automatic controls depending upon the dictates of commercial practice. It is important that the power of instrumentalities that actuate the cutting and impressing instrumentalities, be controlled to the extent of creating a single actuation for each slab of material that is presented thereto. The difficulty has been in automatically feeding preformed substances to the slicing mechanism without utilizing the standard printer that could not heretofore be synchronized with the slicer feeding mechanism. With the teachings of the present invention, a new and improved self-synchronizing preforming mechanism is provided which operates substantially in unison with the substance displacing means or slicing instrumentality feeder means. This automatically synchronizing preformer operating in continuity with the feeder for the slicing mechanism, and the coordinated feeding is effected by providing a floating extruder that is electrically controlled. The floating extruder is reciprocable responsive to the reaction of the preformed substances on the displacing means serving as a feeder to the slicing mechanism. The pace of the preformed substances along the feeder to the slicing mechanism, sets the pace for the operation and self-compensating position of the floating extruder or preformer.

This is controlled automatically by the reaction of the preformed substances on the column leaving the extruder to compensate for variations in substance density, temperature, texture and volume of the substances. This may vary within a wide range in the case of such relatively unstable substances as butter and the like. To insure precision as well as a maximum production by the improved combination of elements that makes possible the simultaneous preforming for continuous slicing, impressing, cutting and/or wrapping through the medium of synchronized extruding and feeding instrumentalities for devices of this character. This improvement in the art of feeding relatively unstable substances which vary in density, volume, temperature and texture, eliminates the necessity of the manual placement of preformed substances from a printer or extruder to a feeder belt which cooperates with a cutter or slicer utilized in conjunction with other processing instrumentalities such as monogramming and segmenting instrumentalities and/or wrapping devices. This labor saving automatic preforming device is rendered self-compensating by the reaction thereon of the discharged preformed substances on the combined feeder and cutter. The floatable preformed position controls the extent or pace of feeding which is rendered constant by electrically controlled devices positioned in the path of the floatably mounted extruder or preformer.

One object of the present invention is to simplify the construction and improve the operation of services of the character mentioned.

Another object is to provide a novel preforming mechanism that continuously moves along a predetermined path in confronting relation to a continuously fed slab of substances to slice uniform segments therefrom.

Still another object is to provide improved means for moving a slicing wire along a reciprocable compound path in its down and up movement to continuously slice slabs from a continuously moving block of plastic substance.

A further object is to provide an improved preforming component of a processing machine which is floatable to compensate for the variations in the linear continuous movement of a slab which is sliced into segments therewith.

A still further object is to provide a movable preforming device in conjunction with a processing feeder for synchronized self-compensating reaction therewith which controls the position and extruding pace of the preforming mechanisms.

Still a further object is to provide an improved feeding mechanism that is self-compensating with the operation of processing instrumentalities while the substances are continuously displaced along a predetermined path for automatically controlled feeding therebetween.

An additional object is to provide an improved floating extruder in combination with a power feeder so that the preformed substances on the latter controls and renders the extruder self-compensating therewith.

Other objects and advantages will appear from the following description of an illustrative embodiment of the present invention.

In the drawings:

Figure 3 is an enlarged side sectional view in elevation of the floatable extruder and feeder mechanism taken substantially along line III—III of Figure 2 in conjunction with the tempering fluid circulating means shown diagrammatically therewith.

Figure 4 is a sectional end view in elevation taken substantially along line IV—IV of Figure 3.

Figure 5 is an end sectional view in elevation taken substantially along line V—V of Figure 3.

Figure 6 is a sectional view in elevation taken substantially along line VI—VI of Figure 3.

Figure 7 is a sectional view in elevation taken substantially along line VII—VII of Figure 3.

Figure 8 is a fragmentary enlarged sectional plan view of the extruder taken substantially along line VIII—VIII of Figure 1, and an electric wiring diagram is schematically shown in connection therewith.

Figure 9 is a fragmentary enlarged sectional view in elevation of the step-up conveyor worm taken substantially along line IX—IX of Figure 2.

Figure 10 is a sectional view in elevation taken substantially along line X—X of Figure 9.

Figure 11 is a sectional view in elevation taken substantially along line XI—XI of Figure 9.

Figure 12 is a sectional view in elevation taken substantially along line XII—XII of Figure 9.

Figure 13 is a plan view of the water tempering fluid worm conveyor commutator assembly shown assembled in Figure 3.

Figure 14 is a sectional view taken substantially along line XIV—XIV of Figure 13.

Figure 1:
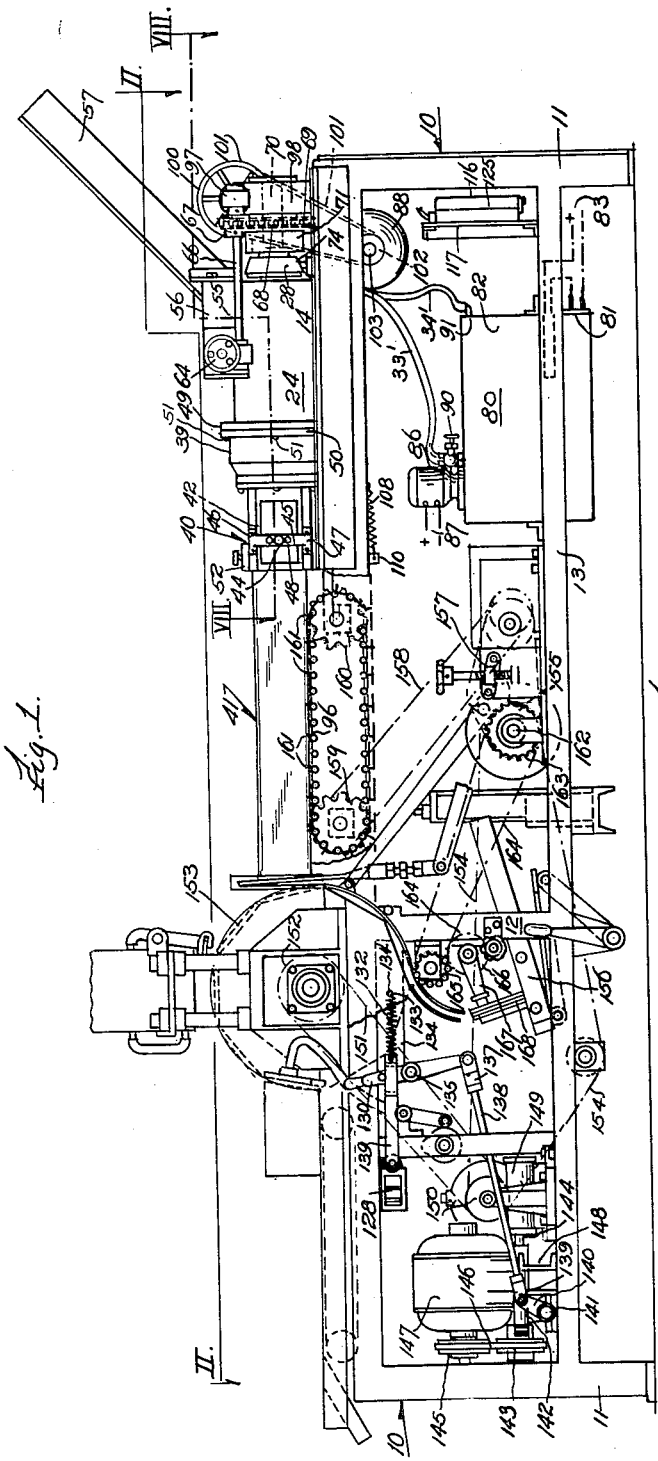
Figure 1 is a side view in elevation of a device embodying features of the present invention, parts thereof being broken away to clarify the showing.
Figure 2:
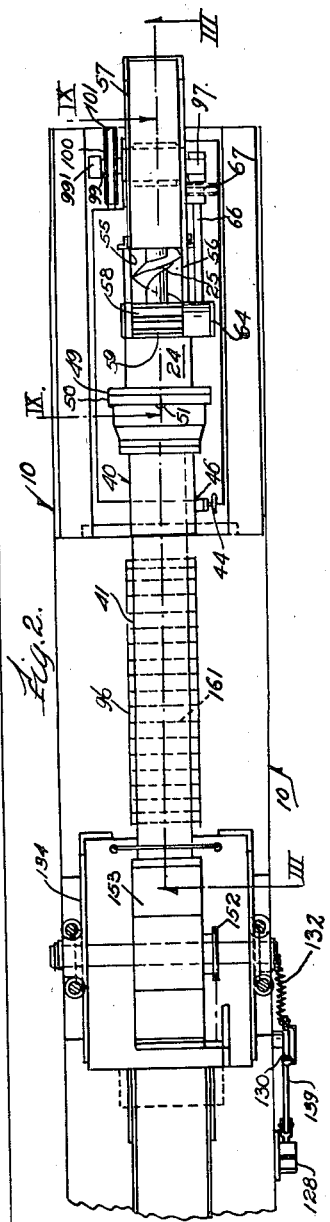
Figure 2 is a plan of the machine shown in Figure 1.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a horizontal frame member 10 of substantially rectangular figuration which is supported at the desired elevation by a plurality of corner standards 11 preferably though not essentially comprising vertical angle irons attached at their upper ends to the frame member 10 by welding, riveting, or other suitable fastening expedients. Intermediate vertical braces 12 depend from the frame member 10 to horizontal braces 13 that extend between the corner standards 11 to reinforce the frame 10 against vibration and creeping as well as to serve as a support for some of the instrumentalities comprising parts of the machine which is illustrative of the invention and the teachings thereof.

The edible plastic substances that are contemplated for processing with the machine comprising the subject matter of this invention may take the form and characteristics of butter which is preferably extruded from an extruder that is specially mounted and rendered reciprocable responsive to the reaction of the preformed column of substances on the power feeder comprising a part of the processing instrumentalities. The extruder comprises, in this instance, a carriage 14 which has a plurality of ball bearing rollers 15, in this instance four, journalled in brackets 16 fixed to the underside of the carriage 14. The rollers 15 are mounted in tracks 17 provided in the table top 10 to movably and reciprocably mount the carriage 14 for to and fro linear movement between limit switches 18—19, in this instance two confronting microswitches mounted on brackets 20—21 (Figures 3 and 8). The brackets 20—21 are fixed to the stationary frame top 10 in the path of an accurately machined trip 22 fixed to a lug 23 formed integral with or fixedly attached to the carriage 14.

A single screw housing 24 of substantially cylindrical shape is mounted on the carriage 14 to receive a hollow spiral conveyor screw 25 having tubular end 26 mounted on a driving shaft coupler 27 splined therewith (Figure 9).

A water slip ring 28 of the commutator type cooperates with complemental peripheral grooves 29—30 in the conveyor screw end 26 to provide for the circulation of a tempering fluid such as temperature controlled hot water through inlet and discharge ports 31—32 having flexible hose 33—34 connected thereto. The tempering fluid enters an axial elongated tube 35 extending along the interior tubular length of the screw 25 which has a threaded plug 36 in at its extremity to provide for the convenient production of the hollow screw interior 37.

As shown, the end convolution 38 of the screw conveyor 25 is of greatly increased diameter to fit into an enlarged end chamber 39 of the housing 24 (Figure 3) to provide an extended preforming throat 40 of the desired length and cross-section so that the extruded substance column 41 will be of the desired corresponding cross-section. With this arrangement, the hitherto comparatively smaller conveyor worm screw 25, which would supply the desired limited production in pounds per hour, was not thought utilizable when as here, a preformed substance column of substantially larger cross-section was required with corresponding decreased unit production limited by the processing instrumentalities operated therewith.

A side size adjusting plate 42 is mounted in the throat 40 (Figures 3 and 5) for connection with a screw 43 projecting through a vertical side wall thereof for mounting in the hub 44 on a side bracket yoke 45 anchored as at 46—47 to the throat 40. A hand manipulating knob 48 is fixed to the screw 43 to enable the extrusion of an accurately sized column of substance such as butter 41. The throat 40 is attached to the discharge end of the enlarged housing end chamber 39 by means of a peripheral flange 49 precision machined for accurated fitted attachment to the correspondingly sized flange 50 comprising part of the enlarged housing chamber 39 for connection through threaded fasteners 51. The enlarged chamber 39 converges at its discharge end to conform substantially in cross-section to the extended throat 40.

The throat 40 is preferably maintained at the desired temperature by means of any suitable means, in this instance, a chambered tempering fluid band 52 in embracing relation therewith proximate to the discharge end of the throat 40. This will insure a smooth solid body to the discharged and preformed substance column 41 without any appreciable friction or displacing reaction. The tempering fluid band 52 is provided with flexible inlet and discharge hose 53—54 for circulating the fluid therethrough from the same circulating system; however, electrical heating units or other temperature maintaining expedients may be employed with equal advantage.

As shown, the housing 24 has an upper rectangular opening 55 over which a substance receiving hopper 56 is attached as otherwise associated to expose the conveyor worm 25 for contact and friction displacement of the substance therealong. The displacement of the substances along the screw or worm 25 for preforming as such emerges from the final enlarged helix or convolution 38, serves to fill the extended throat 40 which pacts the substance solid to conform with the interior configuration thereof. As this occurs, the on-coming increments of substances are forced by the conveyor screw or worm 25 to displace the solid preformed mass from the throat 40 as a solid column 41 for transference to an endless conveyor belt which is synchronized with processing instrumentalities to be hereinafter described.

The feeding of the substances to the conveyor screw or worm 25 is rendered positive with minimum labor requirements through the medium of downwardly inclined open chute 57 wherein the bulk substances such as butter, margarine or the like is deposited in irregular chunks for gravity movement downwardly into and through the rearward open end of the hopper 56 to bring the substance in contact with the conveyor worm or screw 25. A power feeder in the form of a cylindrical roller 58 having a plurality of radially positioned and projecting rectangular comparatively thin blades 59 (Figure 6), in this instance eight such blades, is journalled in the sides of the hopper 56 proximate to the forward end thereof. This feeder 58 is rotated in a clockwise direction (viewed from Figure 3) so that the radially projecting blades 59 that extend across the roller 58 for almost the entire width of the hopper 56, will engage the substance chunks displaced thereagainst and avoid accumulation forwardly of the hopper 56 and insure that all the substances will become lodged into the conveyor screw or worm 25.

The housing 24 conforms is somewhat larger than and generally conforms in circular cross-section to the overall circular form of the individual helical blades of the screw or worm 25 (Figure 6) to insure the uniform translation of the substances therealong responsive to the rotation of the power feeder through a worm gear 60 (Figure 6) splined as at 61 to a shaft 62 projecting into a gear box 63 fixed to the side of the hopper 56 in axial relation to the power feeder roller 58. An end closure plate 64 is fixed to the gear box 63 which houses a worm 65 carried by a stub shaft 66 journalled in the gear box 63 below and normal to the roller shaft 62. The stub shaft 66 carries a sprocket wheel 67 splined for rotation therewith to mesh with an endless sprocket chain 68 that extends to and meshes with a larger sprocket wheel 69 carried by and attached to a stub shaft 70 that is operatively connected to an external coupler ring 71. The coupler ring 71 is disposed behind and adjacent to the liquid slip ring 28 that is complemental to the commutator raceway 74 (Figure 14) that has a reduced axial extension 26 plugged as at 73 to fit into the external coupler ring 71. Consequently, the rotation of the sprocket wheel 69 will impart rotation to the screw or worm 25 provided with an integral slip ring complement 74 having an annular groove 75 which rotates with the screw or worm 25 relative to the stationary commutator ring 28 that rides therein. The commutator ring 28 has the inlet and outlet tubes 33—34 connected thereto for circulating the tempering fluid through the entire length of the screw or worm 25 including its individual helical blades or convolutions.

The tempering fluid commutator construction is fully illustrated in Figures 9 to 14 inclusive which show the progressive relation of parts, it being clear that the peripheral grooves 29—30 in the stationary commutator ring 28 are complemental to aligned and communicating peripheral grooves 76—77 provided in the circumferential surface of the annular track 75. The rotary annular commutator member 75 has a radially disposed port 78 provided as an end bearing support 79 for the elongated axial circulating tube 35 provided interiorly of the tubular screw or worm conveyor 25. With this arrangement, the intake tube 33 is always in communication with the complemental grooves 29—30 and the discharge tube 34 is in constant communication with the same complemental grooves 76—77 so that irrespective of the rotation of the conveyor screw or worm 25, there is always a circuitous tempering fluid path between the inlet and outlet tubes 33—34 to the flooded pump system or other system such as direct supply from a mixture controlled hot and cold water source as will appear more fully hereinafter.

The extruder tempering fluid such as water at an elevated temperature in the approximate neighborhood of 120° Fahrenheit which will vary depending upon the hardness of the butter or other substance is preferably though not essentially supplied from a closed tank 80 mounted on the frame cross bar 13. The tank 80 is heated by an electric heating element 81 which is electrically in series with an adjustable thermostat 82 (Figure 3) to maintain the tempering fluid at a predetermined temperature. A power source 83 supplies the energy to keep the tank immersed electric heater 81 and thermostat 82 in series therewith, to automatically maintain the water at any predetermined temperature. The tank 80 is supplied with an immersed water pump 84 which has an encased vertical shaft 85 extending upwardly through the cover thereof for flanged mounting of an electric motor 86 having electrical wires 87 in series with a power source for rotating the extruder screw or worm 25 such as an extruder connected motor 88 so that water is circulated only when the extruder conveyor screw or worm 25 is rotating responsive to the operation of the electric motor 88. The inlet and outlet flexible pipes 33'—34' are connected to the interior of the tank 80 to provide a water circulation system. The inlet pipe 33' is connected through a water pump discharge pipe 89 that is preferably provided with a hand valve 90 to control the volume of water that is circulated through the conveyor screw or worm 25. The outlet tube 34 which discharges the water from the screw or worm 25, is connected to a fitting 91 provided near the top of the tank 80 (Figure 3).

It should be noted that the extruder inlet tempering pipe 33 does not directly connect with the tank pipe 33', but that a flooded intermediate connecting housing 92 (Figure 3) is provided on the carriage 14 to more readily enable a change in the system and provide for a diffferent circulating system should commercial practice so dictate. The extruder outlet 34 also communicates with a water collector pan 93 (Figure 7) which is provided with a drain 94 for connection of the flexible pipe 34' thereto to direct the water back to the tank 80 through the fitting 91 (Figure 3). In an alternate system wherein the tank 80 is dispensed with, and hot and cold water is taken directly from the water pipe supplies in any particular installation, a water control valve (not shown) is used in conjunction with a solenoid actuator 95 therefor (Figure 8) to shut off the water circulation when the extruder motor 88 is inoperative under conditions which will hereinafter be described. In this system, a thermostat controls a mixing valve between the hot and cold water pipe supplies to maintain the desired temperatures. In that case, the water from the extruder conveyor screw or worm 25 is discharged to a sewer and freshly mixed water is always circulated except when the solenoid valve 95 is closed responsive to the inoperation of or open circuit to the motor 88. Consequently, either the recirculating tank system as shown in Figures 1 to 7 inclusive or the fresh water supply system diagrammatically illustrated in connection with Figure 8 may be employed depending upon the dictates of commercial practice for each particular installation. This tempering fluid system will enable the most effective preforming of the butter or other bulk substance which passes through the machine for conversion into the preformed substance column 41.

The problem of synchronizing the extrusion of preformed substances based upon variables encountered in the extruder housing 24, the different characteristics in the substances, and the variations in production output of the processing instrumentalities, precludes the direct synchronization of the extruder screw or worm 25 with a feeder such as a power operated endless slat belt 96 that is power operated from and timed with any suitable processing instrumentalities, one form of which is illustrated and will be described hereinafter by way of illustration rather than limitation. To this end, the teachings of the present invention embodies a variable automatic compensator operatively connected with the extruder carriage 14 and housing 24, on one hand, and the processing instrumentalities, each being separately driven and synchronized through the medium of improved variable compensator instrumentalities.

To this end, the worm shaft 66 extends rearwardly for a considerable distance to the sprocket wheel 67 (Figure 1) and therebeyond for journalled support in a bearing 97 carried by an upstanding bearing bracket 98 wherein the stub shaft 70 is also journalled to effect its rotary support and that of the conveyor screw or worm 25. The bearing bracket 98 has a stud shaft 99 extending laterally outward therefrom to support a variable pitch driven pulley 100 of standard construction (Figure 6 and 7). The variable pitch pulley 100 consists of two separable confronting tapered discs which are attached to the load to frictionally coact with an endless substantially V-shaped power transmission belt 101 that is in frictional engagement with a variable pitch driver motor pulley 102 carried by an armature shaft 103 which extends from an electric motor 88 attached in inverted position by its base plate 88' to the underside of the carriage 14 through the medium of fasteners 88". A driver pulley pitch automatic speed compensating control operates through a hub engaging adjustable screw 104 carried by a stud 105 journalled in a bell crank bracket 106 suspended by its leg 107 to adjust the spacing of the split variable pitch driver pulley 102 to control the speed of rotation of the instrumentalities comprising the helical conveyor screw 25, the feed roll 58, and the drives therefor which are connected through the gears 60—65, sprockets 67—69, chain 68 as well as the variable pitch pulleys 100—102 and their endless transmission belt 101 for power actuation by the electric motor 88 as will presently appear.

Should the carriage 14 with the extruding housing 24 move forwardly in the direction of the processing instrumentalities which has a power actuated and synchronized feeder such as but not limited to an endless chain slat conveyor belt 96 in which the extruded substance column 41 is deposited for continued displacement in timed relation with the particular processing mechanism operatively connected therewith, the rate of extrusion is automatically increased to keep pace with the processing instrumentalities. The movement of the extruder carriage 14 is controlled by the reaction of the substance column 41 resting on the synchronized processing machine power feeder belt 96, since it is the reaction of the substance column 41 moving into the processing instrumentalities at a predetermined rate synchronized for the desired processing that is responsible for positioning the movable and reciprocably mounted carriage 14 and extruder housing 24. It is this positioning and reciprocable movement of the carriage 14 and extruder housing 24 that compensates for variations in substance density, temperature, texture, and character so that under all these variables including changes in rate or speed of processing the feeding of freshly extruded substances from the extruder throat 40 will keep pace with the power feeder 96 to maintain continuous and solid preformed column 41 thereon of substantially uniform density.

To this end, the carriage 14 is always urged to a limited extent in the direction of the extruded preformed substance column 41 by either inclined track mounting for gravity displacement in that direction or by other expedients such as an elongated tension spring 108 anchored to the carriage as at 109 and to the stationary frame as at 110 (Figure 3). With this arrangement, the carriage will be inclined to move forward under the tension of the spring 108 when the extruder 24—25 issues preformed substances in lesser volume and at a lower linear speed than the pace at which the preformed substance column 41 is being displaced, and to compensate therefor the forward movement of the carriage 14 and extruder housing 24 will cause a lever arm 111 to pivot (see dotted position of lever 111 (Figure 8)). The lever arm 111 is operatively connected to the bell crank adjusting screw mounting screw 104 and stud 105 journalled in the bell crank bracket 106 to pivot therewith. The bell crank bracket 106 depends from the carriage 14 by its vertical leg 107 to pivotably support the screw or stud 104 in exact contact with the pulley hub 103'. The lever arm 111 is connected through the stud or post 105 to respond with the screw 104, end to end, extends underneath the carriage 14 for pivotal connection with a link 112 that is in turn pivotally anchored to a bracket 113. The bracket 113 is attached to an elongated mounting plate 114 that is fixedly attached at 115 to the frame corner standard 11 (Figure 8). Because the adjusting screw stud 104 axially engages the spring impelled pulley spread adjusting hub 103' of standard construction which is fitted to the armature shaft 103 upon which the variable pitch pulley 102 is mounted, the faces of the variable pitch pulley 102 will separate or approach to change the frictional diameter of contact of the belt 101 therewith.

This regulates the linear speed of the belt 101 which depends on whether or not the carriage 14 moves backwardly or forwardly, respectively, as will presently appear from a further description of the electrical controls operatively connected therewith as will appear hereinafter. Suffice it to state that the back and forth movement of the carriage 14 will cause corresponding linear displacement of the variable pitch pulley hub 103' and with the bell crank arm supported screw 104 in axial engagement therewith, the lever arm 111 will pivot as shown in two different dotted positions in Figure 8 so as to lengthen the distance between the point of contact of the adjustable hub engaging screw 104 and the fixed lever arm pivot bracket 113 as the carriage 14 receeds to its extreme backward position responsive to the reaction of the substance column 41 on the substance being extruded from the throat 40. This would occur when the rate of preforming and extrusion for any reason such as comparatively soft consistency of the bulk substance, comparably high temperature thereof, extremely smooth texture or other variables result in increased preforming and extrusion at the same rate of rotation of the spiral screw or worm conveyor 25.

The other factor which would vary the extent of reaction created by the substance column 41 on the endless belt conveyor 96, would be the interrupted operation of the processing instrumentalities which utilize the preformed column 41. In the case where the processing instrumentalities are operating below the average speed for various reasons or the production therfrom is interrupted or not uniform or even at the rated capacity, the substance column 41 would be displaced more slowly than expected and its reaction on the extruder throat 40 would displace the entire carriage 14 and extruder housing 24 rearwardly. This would tend to bring the lever arm 114 in true normal position with the longitudinal path of reciprocable displacement of the carriage 14 and the extruder housing 24 (Figure 8) and thus permit the variable pitch pulley hub 103' to be spring impelled outwardly by the normal spreading urge of the confronting discs comprising the variable speed pulley 102 to cause the belt 101 to frictionally engage therewith along a smaller diameter to reduce the rotary speed of the extrusion screw or worm conveyor 25 so that the substance extrusion would keep pace with the rate of displacement of the substance column 41 on the endless power belt processing conveyor 96. This is rendered possible because the confronting discs of the driven variable pitch pulley 100 on the driven shaft 99, are oppositely spring urged to those of the discs of the driver pulley 102 so that the confronting discs of the pulley 100 will normally approach each other except for the leather belt 101 therebetween; consequently, when the belt 101 moves further down to decrease the diametric pitch of its circumference in the driver pulley 102, the difference in belt length is compensated by other end increasing its diametric pitch and the spring urged approaching discs of the pulley 100 will still be in edge contact with the belt 101 to decrease its linear speed and correspondingly decrease the rotary speed of the extruder screw or worm 25.

When the substance column 41 is being processed at a faster rate than the extrusion from the preforming throat 40, then there is a pulling reaction of the column 41 on the throat 40 so that the carriage 14 with its extruder housing 24 will move forwardly, in this instance with the help of and under the urge of the spring 108. However, the carriage 14 and extruder housing 24 could be balanced on level tracks 15 and the substance column 41 being a continuous solid with the substance under extrusion in the preforming throat 40, would be actually pulled along by the substance column 41 on the endless power conveyor belt 96 and thus cause the carriage 14 to be displaced forwardly so that the lever bar 111 would pivot to its acute angular position shown dotted in Figure 8, thereby causing the variable pulley pitch hub 103' to be depressed by the screw 104. This will cause the confronting discs of the variable pitch driver pulley 102 to approach each other and elevate the belt 101 to increase its diametric pitch of contact therewith to correspondingly increase the linear belt speed and correspondingly increase the rotary speed of the extruder conveyor screw or worm 25. This will increase the quantity of extrusion and thus cause the extruded substance within the preforming throat 40 to keep pace with the processing speed of the preformed substance column 41 to maintain a continuity of processing operations with the aid of the limit micro switches 18—19 and other electrical controls which beside the speed control described supra, will govern the operation of the processing instrumentalities including their power endless belt conveyor 96 as will presently be described.

A three place relay 116 is mounted in a control casing 117 supported by a frame end cross member 13' (Figures 4 and 7), and it controls the operation of the extruder motor 88 through microswitch 19 through the electrical circuit wires 118—119—120 (Figure 8). Wires 121—122 connect with the armature terminals of the relay 116, and extend to the micro-switch 19 to break the circuit when the extruder carriage 14 moves all the way back so that the carriage trip 22 depresses the microswitch 19 to stop all extrusion as well as the tempering fluid pump 86 and allow the substance column 41 to catch up with and move into the processing instrumentalities over the power driven feeder belt 96. It should be noted that the tempering fluid pump 86 is connected by wires 123—124 to the relay motor circuit wires 118—120 (Figure 8) to accomplish this control of the motor 88 and the pump 86. This would also occur when the processing instrumentalities are not functioning nor being fed any preformed substance 41. Now, then when the opposite situation takes place and their is insufficient preformed substances substances 41 on the belt 96 for processing and the processing instrumentalities cannot receive more preformed substances by reason of some interruption in extrusion such as the failure to provide sufficient bulk substances in the hopper slide 57 then the carriage 14 with the extruder housing 24 will move forwardly to its extreme limit so that carriage trip 22 will engage and depress the micro-switch 18 which is connected by wires 125—126 to another relay 125 which is also mounted in the relay casing 117 (Figures 4, 7 and 8).

The relay 125 has two armature lead wires 126—127 connected to a suitable control actuator, in this instance a solenoid 128 which is operatively connected through confronting links 129 to a lever 130. To assist in actuating the lever 130 that controls the operation of the desired processing instrumentalities, the links 129 are anchored at one other extremity 131 to a tension spring 132 that is anchored to the frame of the processing instrumentalities as at 133. Thus the spring 132 will normally urge the lever 130 in a clockwise direction (viewed from Figure 8) to maintain the power substance column feed conveyor 96 operating at the prescribed or rated speed. When the microswitch 18 is depressed, however, the circuit to the relay 125 is closed and the solenoid 128 is energized to displace the lever 130 in a counterclockwise direction (viewed from Figure 8) and thereby render the feed belt 96 inoperative and shut off the processing instrumentalities controlled therewith.

To this end, the lever 130 is pivoted to the machine frame 134 (Figure 1) at 135 for pivotal connection at its bottom extremity 136 to a furcated bracket 137 which is threadedly connected to a tie rod 138 (Figure 8) that controls the operation of suitable processing instrumentalities as will presently appear from a description of a preferred type by way of illustration rather than limitation. It will thus be apparent that between these two extreme limits of carriage movement controlled by limit microswitches 18—19, the carriage 14 may reciprocate constantly for limited distances so as to compensate for variations in feeding or processing of the substance column 41. By this reciprocation of the carriage 14 and extruder throat 40, the extrusion will always keep pace with the processing of the substance column 41, and this device will serve as an automatic compensator therebetween as well as eliminate an additional attendant who otherwise would have to manually control and adjust the extrusion and feeding as well as processing instrumentalities which heretofore have been separately operating machines.

As shown in Figure 1, the processing instrumentalities in the present illustration comprise the combined monogramming and segmenting machine which is detailed and described as well as claimed in copending applications identified on page 1 supra so that a further detailed description thereof is thought superfluous, and reference will be made to only the primary elements thereof for an understanding of one form of processing elements which can successfully be synchronized with the automatic feed synchronizing mechanism comprising the teachings of the present invention. The lever connecting rod 138 terminates in a furcated yoke 139 for pivotal connection with a lever link 140 fixed to a stub shaft 141 that controls the engagement and disengagement of a clutch 142 interposed between the driving pulley 143 and a driven power shaft 144. The driving shaft 143 connects with an armature shaft mounted pulley 145 through the medium of a transmission belt 146. The pulley 145 is driven by an electric motor 147 mounted on a base 148 attached to the lower cross member 13 of the frame 10 (Figure 1).

The driven shaft 144 is operatively connected to a train of gears through a speed reducer 149 that drives a pulley 150 having a double peripheral belt groove thereon to engage a power transmission belt 151 that engages a pulley 152 attached to a ten sided drum 153 on which slabs of preformed substances 41 are simultaneously monogrammed and segmented in a manner fully illustrated and described in the above identified copending patent applications. Another belt 154 extends from the pulley 150 to engage a pulley 155 for driving gears and other instrumentalities that operate a sheet wrapper feed 156 and a speed control mechanism 157. A chain drive 158 extends from the speed control mechanism 157 to a sprocket 159 that operates the power feeder endless slat conveyor belt 96 on which the preformed column of substance 41 is extruded in a manner described supra. Another sprocket 160 supports the power feed endless belt conveyor 96 which has upstanding cleats 161 at spaced intervals to engage the substance column 41 and insure feeding thereof on the conveyor belt 96 without slippage therebetween.

A shaft 162 rotatively supports the pulley 155 and a sprocket 163 for mesh with a chain 164. The chain 164 extends to and engages a sprocket 165 which runs over a portion of a sprocket 166 that also meshes with the chain 164 which imparts rotation thereto. The sprocket 165 is fixed to a stud shaft 167 to rotate rubber finger feeders for the parchment paper liners or wrappers 168 stacked in the sheet wrapper feed mechanism 156. The shaft 162 also rotatively supports an internal track cam 169 (Figure 3) that has a roller cam follower 170 therein. The cam follower 170 is mounted on a lever 171 which is pivoted as at 172 to a vertical bracket 173 supported on the lower frame cross member 13. The lever 171 comprises the actuator for a furcated yoke 174 with which it is pivotally connected as at 175 for operative connection through an adjustable turnbuckle 176 with a wire slicing frame member 177. The slicing frame member 177 carries a slicing wire 178 in conjunction with a tension supporting member 179 to effect the oscillation thereof in relation to the substance column 41 for continuously slicing uniform slabs 180 therefrom in a manner more specifically described in the copending patent applications identified supra preparatory to feeding to the instrumentalities for processing in the desired manner.

It will be apparent from the foregoing that a novel and highly efficient automatic substance column feeder has been provided that is arranged to compensate for variations in extrusion rate or interruptions in the processing thereof in connection with the constant speed feeding conveyor 96 with which the extrusion of the preformed column must be timed and paced with. In the illustrated embodiment, the preforming extruder is reciprocably mounted to and fro relative to the constant speed processing feeder conveyor 96, and extrusion speed compensating means are provided to respond to the to and fro movement of the carriage 14 for inversely controlling the speed compensating mechanism in accordance with the rate of displacement of the preformed substance column 41 on the processing conveyor 96, and limit control means 18—19 in conjunction with electrical relays 116—125 and solenoid 128 constitute independent means to render either the extrusion motor 88 or the processing instrumentality motor 147 inactive when the to and fro movement of the carriage 14 and extruder housing 24 have exceeded the compensating range of the speed control means 79—111—104 (Figure 8) and arrived at their limit of movement determined by the switches 18—19.

This will occur when either the processing instrumentalities are inactive or its operations interrupted by mechanical failure or there is insufficient or no bulk substance in the extrusion mechanism hopper chute 57 and/or the extrusion mechanism has failed to function properly. Nevertheless, under limited variations in either processing or substance column extrusion, the to and fro movement of the carriage 14 and its response in the oscillation of the variable pulley pitch lever 111 (Figure 8), will serve to insure that the extrusion of the preformed substance column 41 will keep pace with the processing thereof so that these machines may be combined and fully synchronized to eliminate at least one attendant who formerly was required in order to feed the substance 41 from a separate extruder to an independently operated processing machine. Additionally, the combination of these two instrumentalities which is made possible by the novel compensator association of one with the other, saves considerable space in a processing plant in that both of these machines do not require any more space than formerly required by the processing instrumentalities alone.

It should be noted that on existing machines, the automatic compensating preforming extruder may be combined with the previously manufactured and existing processing instrumentalities as an attachment with some saving in space but not as fully as though this mechanism was built as a unit at the factory. The operation thereof is fully as automatic and as labor saving as though combined at the factory, since the automatic feed synchronizing apparatus described herein is a self-contained unit which can be combined with any type of processing devices wherein there is a slicer or cutter for the substances column 41 and other instrumentalities such as wrapping devices or the like operate therewith. Such processing instrumentalities either should have or must be supplied with a power feed such as the endless conveyor belt 96 that is operatively connected to and feeds at a constant speed from the power source of the processing instrumentalities. However this arrangement is preferred and described, it should be understood that the automatic compensating preforming means described herein may be used as the power source for the processing instrumentalities should commercial practice so dictate.

While I have illustrated and described a preferred embodiment of this invention, it must be understood that the invention is capable of considerable variation and modification without departing from the spirit of the invention. I, therefore, do not wish to be limited to the precise details of construction or arrangement set forth, but desire to avail myself of such variations and modifications as come within the scope of the appended claims.

I claim:

1. In a plasticizing and preforming device of the character mentioned, the combination with means for displacing irregular masses of plastic substances at a substantially uniform rate along a predetermined path, means associated with said displacing means for extrusion of the irregular masses of plastic substances into elongated columns of preformed substances, means in said path for converting said preformed substances into uniform preformed increments, conveyor means between said extrusion and increment converting means to present said elongated uniform column of substances to said converting means responsive to the latter uniform rate of displacement, and means reacting to said substance preforming means to synchronize the operation of said displacing and increment converting means in a continuity of coordinated operations of said preforming, feeding and increment converting means.

2. In a plasticizing and preforming device of the character mentioned, the combination with means for displacing irregular masses of plastic substances at a substantially uniform rate along a predetermined path, means associated with said displacing means for extrusion of the irregular masses of plastic substances into elongated columns of preformed substances, means in said path for converting said preformed substances into uniform preformed increments conveyor means between said extrusion and increment converting means to present said elongated uniform column of substances to said converting means responsive to the latter uniform rate of displacement, means for preforming the substances substantially in unison with said displacing and increment converting means, and means reacting to said substance preforming means to synchronize the operation thereof with said displacing means for regulating the displacement of said substances from said preforming means to said displacing means in accordance with the pace of the latter in a continuity of coordinated operations of said preforming, feeding and increment converting means.

3. In a device of the character mentioned, the combination with a frame, of translatable housing feeding and extrusion means on said frame for feeding irregular plastic masses for extrusion in elongated preformed substance columns from said translatable means, conveyor means associated with said translatable housing feeding and extrusion means for displacing preformed substances at a substantially uniform rate along a predetermined path, means in said path for converting said preformed substances into uniform increments responsive to the uniform rate of displacement of said conveyor means, means for preforming the substances substantially in unison with said conveyor displacing and increment converting means, means responsive to the reaction of said preformed substances on said conveyor displacing means to displace said translatable means for regulating the displacement of said substances from said preforming means to said displacing means in accordance with the pace of the latter, and power means for synchronizing the continuity of coordinated operations of said preforming, feeding and increment converting means.

4. In a device of the character mentioned, the combination with a frame, of translatable housing feeding and extrusion means on said frame for feeding irregular plastic masses for extrusion in elongated preformed substance columns from said translatable means, conveyor means associated with said translatable housing feeding and extrusion means for displacing preformed substances at a substantially uniform rate along a predetermined path, means in said path for converting said preformed substances into uniform increments responsive to the uniform rate of displacement of said conveyor means, said movably mounted translatable feeding means being displaceable forwardly and rearwardly responsive to the reaction with the preformed column on said conveyor means for preforming the substances substantially in unison with said displacing and increment converting means, and power means for synchronizing the continuity of coordinated operations of said preforming, feeding and increment converting means.

5. In a device of the character mentioned, the combination with a frame, of translatable housing feeding and extrusion means on said frame for feeding irregular plastic masses for extrusion in elongated preformed substance columns from said translatable means, conveyor means associated with said translatable housing feeding and extrusion means for displacing preformed substances at a substantially uniform rate along a predetermined path, means in said path for converting said preformed substances into uniform increments responsive to the uniform rate of displacement of said conveyor means, said movably mounted translatable feeding means being displaceable forwardly and rearwardly responsive to the reaction with the preformed column on said conveyor means responsive to the reaction of said preformed substances on said displacing means for preforming the substances substantially in unison with said displacing and increment converting means, and power means for synchronizing the continuity of coordinated operations of said preforming, feeding and increment converting means.

6. In a device of the character mentioned, the combination with a frame, of means on said frame for displacing substances along a predetermined path, of means on said frame for feeding substances to said last named means, means on said frame for movably mounting said feeding means for reciprocable displacement in linear alignment with said substance displacing means for positioning the former responsive to the physical reaction with substances on said displacing means to maintain the uniform feeding of substances to said displacing means. and control means for limiting the reciprocable displacement of said feeding means in accordance with the pace of said substance displacing means.

7. In a device of the character mentioned, the combination with a frame, of means on said frame for displacing substances along a predetermined path, of means on said frame for feeding substances to said last named means, means on said frame for movably mounting said feeding means for reciprocable displacement in linear alignment with said substance displacing means for positioning the former responsive to the physical reaction with substances on said displacing means to maintain the uniform feeding of substances to said displacing means, and electrical control means for limiting the reciprocable displacement of said feeding means in accordance with the pace of said substance displacing means responsive the reaction of the substances on the latter.

8. In a device of the character mentioned, the combination with a frame, of means on said frame for displacing substances along a predetermined path, of means on said frame for feeding substances to said last named means, means on said frame for movably mounting said feeding means for reciprocable displacement in linear alignment with said substance displacing means for positioning the former responsive to the physical reaction with substances on said displacing means to maintain the uniform feeding of substances to said displacing means, and electrical control means including a variable pitch pulley motor control mechanism responsive to the position of said movably mounted feeding means for limiting the reciprocable displacement of said feeding means in accordance with the pace of said substance displacing means responsive the reaction of the substances on the latter.

9. In a device of the character mentioned, the combination with a frame, of means on said frame for displacing substances along a predetermined path, of means on said frame for feeding substances to said last named means, means on said frame for movably mounting said feeding means for reciprocable displacement in linear alignment with said substance displacing means for positioning the former responsive to the physical reaction with substances on said displacing means to maintain the uniform feeding of substances to said displacing means, and electrical control means including limit switches for limiting the reciprocable displacement of said feeding means in accordance with the pace of said substance displacing means responsive the reaction of the substances on the latter.

10. In a device of the character mentioned, the combination with a frame, of means on said frame for feeding preformed substances at a constant linear speed along a predetermined path on said frame, movably mounted extrusion preforming means on said frame for to and fro movement relative to said constant feeding means, means on said frame in the path of said preforming means for limiting the to and fro movement of said extrusion preforming means to compensate for variations in displacement of the substances from either or both of said extrusion preforming means and said constant power feeding means, and means on said frame and electrically connected with and responsive to said to and fro limiting means to control the operation of said extrusion preforming and constant power feeding means.

11. In a device of the character mentioned, the combination with a frame, of means on said frame for feeding preformed substances at a constant linear speed along a predetermined path on said frame, movably mounted extrusion preforming means on said frame for to and fro movement relative to said constant feeding means, electric switch control means on said frame in the path of said extrusion preforming means for limiting the to and fro movement of said extrusion preforming means to compensate for variations in displacement of the substances from either or both of said extrusion preforming means and said constant power feeding means, and electric switch actuated means responsive to said to and fro electric switch limiting means to control the operation of said extrusion preforming and constant power feeding means.

12. In a device of the character described, the combination with a frame, of means on said frame for feeding preformed substances at a constant linear speed along a predetermined path on said frame, movably mounted extrustion preforming means on said frame for to and fro movement relative to said constant feeding means, means on said frame in the path of said preforming means for limiting the to and fro movement of said extrusion preforming means to compensate for variations in displacement of the substances from either or both of said extrusion preforming means and said constant feeding means, variable speed operating means on said extrusion preforming means to vary the extrusion rate responsive to the to and fro movement thereof independent of said limiting means, and means responsive to said to and fro limiting means to control the operations of said extrusion preforming and constant power feeding means.

13. In a device of the character mentioned, the combination with a frame, of means on said frame for feeding preformed substances at a constant linear speed along a predetermined path on said frame, movably mounted preforming means on said frame for to and fro movement relative to said constant feeding means, electric switch control means on said frame in the path of said preforming means for limiting the to and fro movement of said preforming means to compensate for variations in displacement of the substances from either or both of said preforming means and said constant power feeding means, variable speed operating means on said preforming means to vary the rate of substance discharge therefrom responsive to the to and fro movement thereof independent of said electric switch limiting means, and electric switch actuated means responsive to said to and fro electric switch limiting means to control the operation of said preforming means and constant power feeding means.

14. In a device of the character mentioned, the combination with a frame, of means on said frame for feeding preformed substances at a constant linear speed along a predetermined path on said frame, movably mounted extrusion preforming means on said frame for to and fro movement relative to said constant feeding means, electric micro-switch control means on said frame, trip means on said extrusion preforming means in the path of said electric micro-switch control means for limiting the to and fro movement of said extrusion preforming means to compensate for variations in displacement of the substances from either or both of said extrusion preforming means and said constant power feeding means, and electric relays in circuit with said micro-switch control means for controlling the operation of said extrusion preforming means and said power feeder means responsive to the to and fro electric micro-switch limiting means to control the operation of said extrusion preforming and constant power feeding means.

15. In a device of the character mentioned, the combination with a frame, of means on said frame for feeding preformed substances at a constant linear speed along a predetermined path on said frame, movably mounted extrusion preforming means on said frame for to and fro movement relative to said constant feeding means, electric micro-switch control means on said frame, trip means on said extrusion preforming means in the path of said electric micro-switch control means for limiting the to and fro movement of said extrusion preforming means to compensate for variations in the displacement of the substances from either or both of said extrusion preforming means and said constant power feeding means, variable speed operating means on said extrusion preforming means to vary the extrusion rate responsive to the to and fro movement thereof independent of said electric micro-switch limiting means, and electric relays for controlling the operation of said extrusion preforming means and said power feeder means responsive to the to and fro electric micro-switch limiting means to control the operation of said extrusion preforming and constant power feeding means.

16. In a device of the character mentioned, the combination with a frame, of means on said frame for feeding preformed substances at a constant linear speed along a predetermined path on said frame, movably mounted preforming means on said frame for to and fro movement relative to said constant feeding means, electric micro-switch control means on said frame, trip means on said preforming means in the path of said electric micro-switch control means for limiting the to and fro movement of said preforming means to compensate for variations in the displacement of the substances from either or both of said preforming means and said constant power feeding means, variable speed operating means on said preforming means to vary the rate of discharge therefrom responsive to the to and fro movement of said preforming means independent of said electric micro-switch limiting means, electric relays for controlling the operation of said preforming means and said constant power feeding means, and means responsive to said electric relays to render said preforming means and said power feeder means inactive depending upon the actuation of said electric micro-switch limiting means by the to and fro maximum movement of said preforming means.

17. In a device of the character mentioned, the combination with a frame, of means on said frame for feeding preformed substances at a constant linear speed along a predetermined path on said frame, movably mounted preforming means on said frame for to and fro movement relative to said constant feeding means, electric micro-switch control means on said frame, trip means on said preforming means in the path of said electric micro-switch control means for limiting the to and fro movement of said preforming means to compensate for variations in the displacement of the substances from either or both of said preforming means and said constant power feeding means, variable speed operating means on said preforming means to vary the rate of discharge therefrom responsive to the to and fro movement of said preforming means independent of said electric micro-switch limiting means, electric relays for controlling the operation of said preforming means and said constant power feeding means, means responsive to said electric relays to render said preforming means and said power feeder means inactive depending upon the actuation of said electric micro-switch limiting means by the to and fro maximum movement of said preforming means, and means synchronized with said power feeder means for processing the preformed substances in timed relation with said power feeder means.

18. In a device of the character described, the combination with a frame, of substance preforming means on said frame, power feeder means on said frame for displacing the substances from said preforming means, electric motor driving means on said frame for each of said preforming means and said power feeder means and in operative connection therewith, variable speed means interposed between said preforming means and said electric motor driving means therefor, said variable speed means including means for inversely controlling said variable speed means in accordance with the rate of displacement of the preformed substances on said power feeder means, and other means on said frame in the path of said preforming means for rendering inactive said power feeder motor driving means whenever said variable speed controlled preforming means cannot keep pace with said power feeder means.

19. In a device of the character mentioned, the combination with a frame, of substance preforming means on said frame, power feeder means for displacing the substances from said preforming means, electric motor driving means on said frame for each of said preforming and power feeder means, variable speed means interposed between said preforming means and said electric motor driving means therefore, said variable speed means including means for inversely controlling said variable speed means in accordance with the rate of displacement of the preformed substances on said power feeder means, and electric limit control means on said frame in the path of said preforming means for rendering inactive said electric motor driving means for either said preforming means or said power feeder means whenever said variable speed control means is ineffective to maintain the preformed substance displacement in pace between said power feeder means and said preforming means.

20. In a device of the character mentioned, the combination with a frame, of reciprocable substance preforming means on said frame, power means for feeding the preformed substances at a constant speed from said reciprocable preforming means, electric motor driving means on said frame for each of said preforming and constant speed feeding means and in operative connection therewith, variable speed means interposed between said preforming means and said electric motor driving means therefor to respond to the to and fro movement of said preforming means, said variable speed means including means responsive to the reciprocation of said preforming means relative to said constant feeding means for inversely controlling said variable speed means in accordance with the rate of displacement of the preformed substances on said constant speed feeding means, and electric limit control means on said frame in the path of said preforming means, said electric control means including electric relay responsive means for rendering inactive said electric motor driving means for either said preforming means or said constant feeding means whenever said variable speed control means is ineffective to maintain the preformed substance displacement in pace between said power feeding means and said preforming means responsive to the to and fro movement of the latter caused by the reaction of the substance column thereon.

References Cited in the file of this patent

UNITED STATES PATENTS

| Number | Name | Date |
|---|---|---|
| 1,125,705 | Messiter | Jan. 19, 1915 |
| 1,742,434 | Costello | Jan. 7, 1930 |
| 1,808,563 | Mayne | June 2, 1931 |
| 1,810,740 | Vogt | June 16, 1931 |
| 2,125,926 | Kalmbach | Aug. 9, 1938 |
| 2,162,443 | Muller | June 13, 1939 |
| 2,387,810 | Smith | Oct. 30, 1945 |
| 2,455,944 | Nordquist | Dec. 14, 1948 |
| 2,474,136 | Wilson et al. | June 21, 1949 |
| 2,519,089 | Whitaker | Aug. 15, 1950 |
| 2,549,908 | Johansen | Apr. 24, 1951 |
| 2,566,854 | Rhodes | Sept. 4, 1951 |
| 2,632,554 | Wilcox | Mar. 24, 1953 |